March 17, 1970     J. J. E. MESNAGER     3,500,763
HIGH-SPEED TRANSPORTATION SYSTEMS EMPLOYING
GROUND-EFFECT VEHICLES
Filed Aug. 15, 1966     2 Sheets-Sheet 1

INVENTOR
JACQUES JEAN EMILE MESNAGER
By: McGlew and Toren
ATTORNEYS

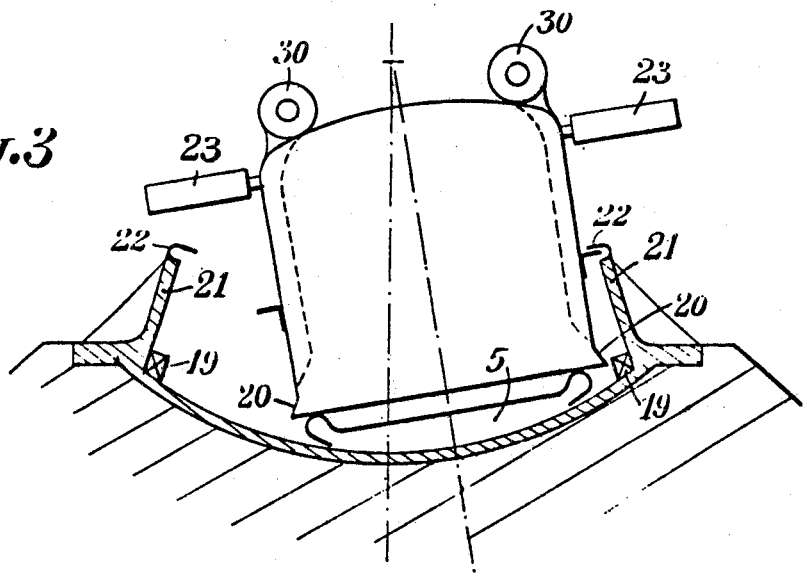
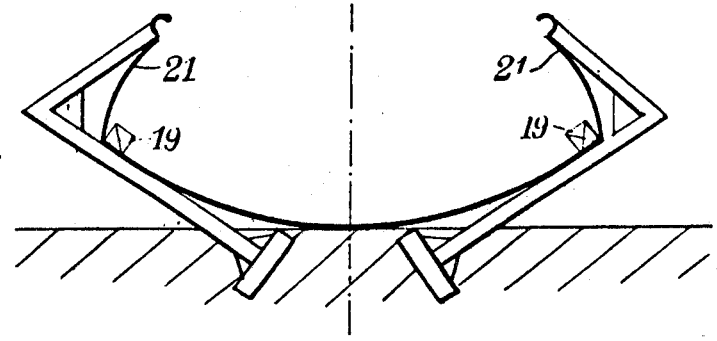
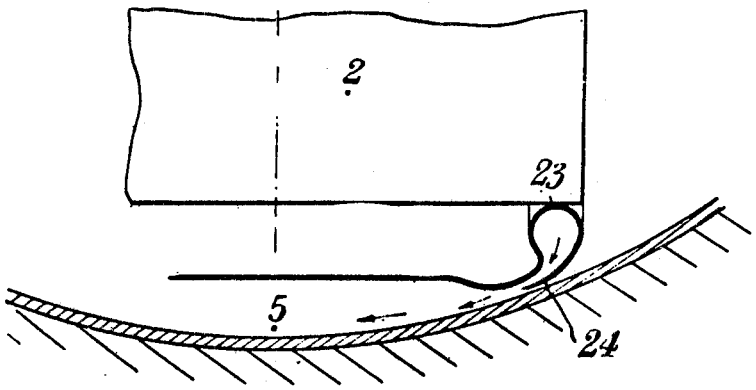

United States Patent Office 3,500,763
Patented Mar. 17, 1970

3,500,763
HIGH-SPEED TRANSPORTATION SYSTEMS EMPLOYING GROUND-EFFECT VEHICLES
Jacques Jean Emile Mesnager, 182 Rue de Rivoli, Paris, France
Filed Aug. 15, 1966, Ser. No. 572,274
Claims priority, application France, Aug. 17, 1965, 28,501
Int. Cl. B60v 3/04; E01b 26/00; A63g 21/00
U.S. Cl. 104—23
4 Claims

ABSTRACT OF THE DISCLOSURE

This invention relates to land vehicles hovering at high speed by means of air cushions on tracks. To balance the action of transverse forces, such as centrifugal forces generated in curved track sections, these track sections must necessarily be canted; however, this cant is applicable only for given speed values. To avoid this inconvenience, it is proposed by this invention to use a track having a circular cross-sectional configuration so that the vehicle will take by itself at any time on such track a position of equilibrium in which the resultant of the transverse forces and of the relative weight lies in the longitudinal plane of symmetry of the vehicle, the virtual axis about which the vehicle can oscillate freely passing through the center of the cross-sectional track contour, above the center of gravity of the vehicle.

---

The use of very fast guided ground-effect vehicles circulating at several hundreds m.p.h. is rendered very difficult by the action of centrifugal force in curves.

With a one-kilometer radius as currently employed in first-order railway systems the centrifugal force equals gravity at 196.6 m.p.h. and twice that value at 306.8 m.p.h.

With a 500-meter radius as encountered sometimes on similar lines (for instance on the Paris-Toulouse line) the centrifugal force equals gravity at 157.85 m.p.h. and is twice that value at 221 m.p.h.

When the centrifugal force attains the same value as gravity, seated passengers invariably slip on their seats and hit the external wall if they are not attached by safety belts. The same effect is observed with luggages on their racks.

Standing passengers are knocked down and thrown head first against the outer wall at a speed which may equal a free fall from a height equal to their distance from said wall, which may be several feet.

To make ground-effect vehicles suitable for transporting passengers the present invention provides a solution consisting in enabling the vehicle hovering on an air cushion to oscillate about a horizontal axis or shaft disposed above its center of gravity, so that the resultant of the gravity force and centrifugal force remains perpendicular to the floor under all circumstances.

Thus the passengers, goods and other objects are safely protected against any tendency to slip transversely or being knocked down.

Only the apparent gravity will be increased by 41.4% and 124% in the two cases contemplated hereinabove.

In order to afford a clearer understanding of this invention and of the manner in which the same may be carried out in practive, a typical system embodiment will now be described with reference to the accompanying drawings, in which:

FIGURE 3 shows details of a track of the type shown in FIGURES 1 and 2;

FIGURE 4 is a similar view in the case of a track made of relatively thin sheet-metal supported by brackets embedded in the ground, and FIGURE 5 is a detail view.

Figure 1:
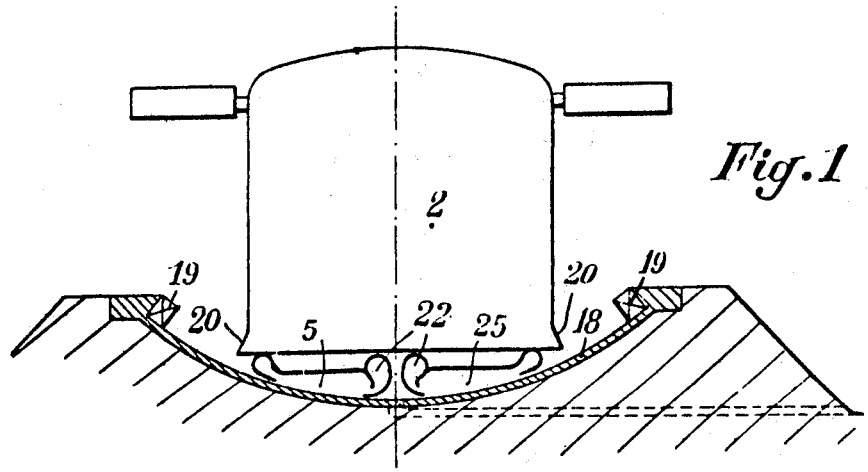
FIGURES 1 and 2 are diagrammatic cross-sectional views showing a vehicle supported by air-cushions on a concave or trough-shaped track formed in the ground.
Figure 2:
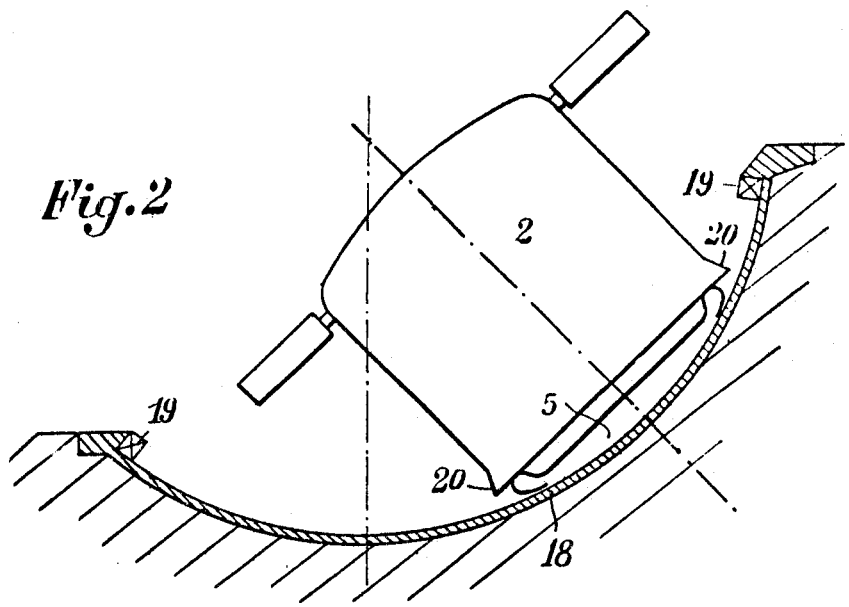

The trough-shaped track 18 is a horizontal cylinder of revolution in straight sections, and a tore having a vertical axis with the same generating circle in curved sections. The center of this generating circle must be at a higher level than the center of gravity of the vehicle, since the vehicle must be capable of oscillating about an axis overlying the center of gravity.

Thus, the vehicle will not only hover longitudinally on its air-cushions 5 formed between the vehicle body and the track, but also oscillate about the horizontal axis centered on the axis 0 of the circle generating the cylinder or the tore.

Along straight-line track sections gravity will urge the vehicle to its vertical position, the center of gravity being located below the axis of the trough-shaped track.

For the same reason in curved track sections the vehicle will tend to take the inclined position corresponding to the resultant of gravity and the centrifugal force.

The trough-sectioned track must have an excess width in curves, on the outer side, to allow this inclination without any risk of running off the track.

In straight sections the trough-sectioned track must also have an excess width on both sides to permit the inclination of the vehicles in case of strong transverse wind or a lateral overpressure resulting for example from the crossing of two vehicles or trains of vehicles circulating on parallel adjacent tracks, or to the presence of an obstacle on one side of the track, such as bridge piers, trench-supporting walls, tunnel piers, etc.

Lateral guard or stop rails 19 in the form of abutment-forming slideways engageable by friction members 20 equipped with springs and shock absorbers (not shown) carried by the vehicles will prevent these from running off in case an unforeseen action impressed an abnormally high inclination to the vehicles.

Lateral screen means 21 (FIGURES 3 and 4) may also be provided for trapping an air-cushion between them and the relevant side of the vehicle before the abutment-forming slideways 19 engage the friction members 20. The pressure of this air-cushion may be sufficient to produce a relatively strong elastic return torque, thus avoiding the undesired use of said friction members, due to the considerable lateral surface area of the vehicles available below the windows. Thus, any detrimental shocks and frictional contacts can safely be eliminated.

The air pressure in these lateral air-cushions may be increased by using baffle or labyrinth joints 22, or flexible blades, to reduce the leakage output over their edges.

This air pressure may be increased by adding air inlets 30 having forwardly directed mouths.

Except for very exceptional cases in which the vehicles would reach the maximum inclination limited by these devices the vehicle will constantly assume the inclination corresponding to the resultant of gravity, the centrifugal force and the lateral wind or air pressures.

The vehicles are thus constantly guided by the normal reaction produced by the trough-sectioned track as in a toboggan.

Horizontal and/or vertical aileron-type balancing-flaps 23 may advantageously be added to prevent said lateral pressures from generating permanent rolling oscillations and causing discomfort to the passengers.

To avoid the necessity of manually controlling these balancing-flaps by the operator of the vehicle, this stabilizing device may be equipped with damped pendulum means adapted constantly to return the vehicles in the direction of the resultant of the gravity and the centrifugal force.

The position of the center of gravity of a vehicle may undergo changes for example as a consequence of displacements of the passengers and luggages within the vehicle. Therefore, it will be necessary that the resultant of the thrusts exerted by the air-cushions be automatically shifted so as to constantly pass through this center of gravity.

Therefore, at least two air-cushions must be disposed in the longitudinal direction and have their pressure so adjusted that the resultant of the two corresponding forces lies in the transverse plane containing the center of gravity.

At least two air-cushions 5, 25 (FIGURE 1) must also be provided in the transverse plane so that the resultant of their thrusts, which converge both towards the axis of the trough-shaped track, revolve about this axis to intersect the axis of gravity of the vehicle and of its load, by means of a proper variation in the pressures produced therein.

Under these conditions, at least three air-cushions must be provided in each vehicle: one in the width of the vehicle and along only one portion of the vehicle length, and two side by side (FIGURE 1) on either side of the longitudinal axial plane on the remaining longitudinal portion.

The pressure is automatically adjusted in these air-cushions due to the variation in the leakage output along the edges according to the distance between these edges (assumed to be without flexible frictional blades constituting air-tight joints) and the track, the air-cushions being constantly supplied with air.

The greater the distance from the edge to the trough-shaped track, the higher the leakage output, the lower the pressure in the relevant air-cushion, so that the vehicle will be lowered.

Conversely, increasing the distance from the edge to the trough-shaped track will reduce the leakage output and increase the pressure, thus inclining the vehicle.

Thus, the stability of the vehicle at small edge-to-track distance values will be maintained.

The air-cushions are produced by fan means when the vehicle starts from rest, but when a sufficient speed is attained forwardly directed air inlets will permit of utilizing for this purpose the air overpressure resulting from the forward motion of the vehicle, valve means being provided to prevent the air stream produced by the fan from flowing back through said air inlets at low speeds.

Thus, provided that the air inlets have a sufficient cross-sectional area, a very considerable lift thrust will be obtained even at very low speed values without any power consumption in the jet-forming fan.

The leakage output at the external periphery of the air-cushions may be reduced, given an equal gap between the edges of the air-cushions and the surface of the trough-shaped track, or this gap may be increased for a same leakage, by using the following device:

Each air-cushion will be supplied at least partly (FIGURE 5) through a double wall 23 extending along the outer periphery of the air-cushion and constituting a convergent duct directed tangentially to the surface of the trough-shaped track and towards the interior of said cushion. In this convergent duct the air expansion from the supply pressure to the atmospheric pressure will convert the pressure energy into speed energy, which will again be converted into pressure by a divergent duct. This divergent duct will be bounded on one side by the trough-shaped track and on the other side by the cylindrical extension of the internal wall 24 of said convergent.

When the pressure is low within the cushion, the assembly will constitute an aspirator drawing atmospheric air into the cushion.

The walls of the convergent duct like those of the divergent duct will preferably consist of elastic materials such as thin sheet-metal stock, rubber, or plastic materials reinforced if necessary by spring means preventing their deterioration in case of accidental abnormal projection of a track portion causing a contact therewith.

Retractable, preferably tyre-mounted wheels, for example of the type used on aircraft landing carriages, may be provided on the ground effect vehicles. In stations, the trough-sectioned tracks would be replaced by flat surfaces engaged by these wheels at low speed, when the pressure is decreased within the air-cushions. Wheels responsive to a steering system are provided in this case to permit all necessary maneuvers and branching operations, as in bus or coach stations.

Another modified form of embodiment may consist in providing the retractable wheels with flanges and causing these wheels to roll on rails disposed on either side of the trough-sectioned tracks in the sections where the trough flattens gradually, so as to convert the ground-effect vehicles into ordinary railway vehicles in stations where they are circulated at low speed with conventional points.

A third form of embodiment of terminal stations may consist in providing a transverse-motion carriage for shifting a trough-shaped track section in a direction across its axis and thus transfer the air-cushion vehicle to any one of a plurality of parallel tracks.

The trough-shaped track may be constructed by using any suitable material such as concrete, steel, plastic material, stabilized earth, etc.

A thin metal sheet construction would be particularly economical. Only moderate air pressures are necessary within the cushions. The trough-shaped track has the shape of a funicular of these pressures. Stiffening means may therefore be dispensed with, even with a trough-supported by relatively spaced supports. The relatively high resistance moment of the cylinder segment, further increased by the lateral abutment-forming means preventing the vehicle from running off and possibly by screen means provided for creating lateral retaining air-cushions, would permit of increasing the relative spacing of the track supports, even with very moderate thickness values.

The type of track thus obtained would provide a particularly noiseless and economical ground-effect transportation system.

In the case of electric traction—which is advantageous from the dual point of view of silence and of the suppression of fire-hazards resulting from the transport of fuel—the use of steel-sheet trough-sectioned track would permit the return of the current fed through a catenary. Metal brushes or collecting shoes would provide the electrical connection with the vehicles.

The contact wire of the catenary would be placed preferably along or close to the axis of curvature of the cylindrical trough, the pantagraphs comprising in this case circular contact bows centered on the same axis.

What I claim is:

1. Transport system comprising at least one vehicle supported by air cushions above a track, wherein said track has a circular cross-section broader than the supporting surface of the vehicle by an amount permitting transverse oscillations of said vehicle in relation to the longitudinal direction of said track when said vehicle is subjected to transverse forces in relation to its direction of travel, said vehicle assuming at any time on said track a position of equilibrium in which the resultant of the transverse force and of the weight of the vehicle lies in a longitudinal plane of symmetry of said vehicle, the virtual axis of oscillation of the vehicle passing at any time through the center of the circular cross-sectional contour of the track and lying above the center of gravity of the vehicle.

2. Transportation system according to claim 1, comprising a trough-like track, having at least the same width as the vehicle, which is raised externally of curves and has substantially the shape of a segment of a horizontal cylinder of revolution along straight track sections, the track shape in curves corresponding to a tore having a vertical axis, the axis of the circle generating said cylinder or said tore being constantly at a higher level than the center of gravity of the vehicle.

3. Transportation system according to claim 1, comprising balancing-flaps mounted on the body of the vehicle, and pendulum means having its movements damped by servo-motor means for controlling said balancing-flaps.

4. A ground effect transport system comprising a track having a concave bearing surface which is, over a substantially unobstructed transverse span thereof, smoothly and continuously curved in cross-sectional outline about a center of curvature, and a machine movable along said track with the interposition therebetween of at least one pressurized fluid cushion, said machine comprising wall means for laterally bounding said fluid cushion and which end in free edges oppositely adjacent the curved outline of said bearing surface, said free edges lying within the transverse extent of the curvature of said bearing surface along a convex arc which extends oppositely adjacent to the curved outline of said bearing surface and which arc has substantially the same center of curvature as the curvature of said bearing surface, whereby said machine may be angularly displaced relative to said bearing surface with said free edges moving along said arc thereof and remaining oppositely adjacent to said curved outline of said bearing surface analogously to said machine being a pendulum suspended from said center of curvature.

References Cited

UNITED STATES PATENTS

| 3,096,728 | 7/1963 | Amann | 104—134 |
| 3,190,235 | 6/1965 | Bertin | 104—134 |
| 3,299,565 | 1/1967 | Yarashes | 104—124 X |

FOREIGN PATENTS 111,698  4/1962  Pakistan.

JAMES B. MARBERT, Primary Examiner

U. S. Cl. X. R.

104—132, 134